United States Patent [19]
Bestenreiner et al.

[11] 3,748,019
[45] July 24, 1973

[54] PHOTOGRAPHIC RECORDING AND REPRODUCING METHOD AND APPARATUS UTILIZING SPATIAL CARRIER FREQUENCIES

[75] Inventors: Friedrich Bestenreiner; Reinhold Deml, both of Munich, Germany

[73] Assignee: AGFA-Gevaert Aktiengesellschaft, Leverkusen, Germany

[22] Filed: Apr. 12, 1971

[21] Appl. No.: 133,438

Related U.S. Application Data

[63] Continuation of Ser. No. 803,676, March 3, 1969, abandoned.

[30] Foreign Application Priority Data
Mar. 2, 1968 Germany.................. P 16 22 865.2
June 4, 1968 Germany.................. P 17 72 568.7

[52] U.S. Cl............................. 350/162 SF, 96/45.2
[51] Int. Cl. ......................................... G02b 27/38
[58] Field of Search ................. 350/162 SF; 96/45.2

[56] References Cited
UNITED STATES PATENTS

| | | | |
|---|---|---|---|
| 3,504,606 | 4/1970 | Macovski................ | 350/162 SF UX |
| 3,567,305 | 3/1971 | Collier et al.................... | 350/317 X |
| 3,152,902 | 10/1964 | Jacobs ............................ | 96/45.2 X |
| 3,442,566 | 5/1969 | Forward et al. ..................... | 350/3.5 |
| 755,983 | 3/1904 | Wood..................... | 350/162 SF UX |
| 2,050,417 | 8/1936 | Bocca...................... | 350/162 SF UX |
| 3,314,052 | 4/1967 | Lohmann.................... | 350/162 R X |
| 3,408,143 | 10/1968 | Mueller .................. | 350/162 SF UX |
| 3,478,661 | 11/1969 | Heckscher.............. | 350/162 SF UX |

*Primary Examiner*—John K. Corbin
*Attorney*—Michael S. Striker

[57] ABSTRACT

The picture of an object and a grating are formed on a photosensitive layer, and developed. The developed picture is illuminated and projected through openings of a diaphragm which blocks a direct image. Due to the grating, diffraction orders for imaging the picture are produced so that the grating has the effect of a spatial carrier frequency.

5 Claims, 10 Drawing Figures

INVENTOR.
FRIEDRICH BESTENREINER
BY REINHOLD DEML

PHOTOGRAPHIC RECORDING AND REPRODUCING METHOD AND APPARATUS UTILIZING SPATIAL CARRIER FREQUENCIES

This is a continuation of application Ser. No. 803,676, filed Mar. 3, 1969, now abandoned.

BACKGROUND OF THE INVENTION

In the recently developed holographic method of photographic picture recording, an image in the form of interferences between a picture modulated ray, the so-called object ray, and of a reference ray is recorded on a photosensitive layer. It is essential that the object ray and the reference ray are coherent. Due to this fact, the holographic recording method is limited to specific objects of small size, the illuminating of a large object by coherent light is possible only under great difficulties, and can generally only be effected by laser rays. On the other hand, holography offers so many possibilities, such as superimposing of several pictures, three dimensional reproduction, and others that the disadvantage regarding the required source of light had to be accepted.

SUMMARY OF THE INVENTION

It is one object of the invention to provide a method of photographic picture recording and reproducing which has substantially the same possibilities as holography, without being limited to the use of coherent light.

Another object of the invention is to provide a new method of color photography.

Another object of the invention is to provide a new photographic coding method.

Another object of the invention is to form on a screen or photographic layer, an image formed of rays diffracted by a grating without producing any part of the picture by direct rays.

With these objects in view, a method according to the invention refers to the recording of an image on a photographic layer through a grating which is in contact with the layer, or imaged on the same, or on a layer which has a grating of a different sensitivity, while diffraction orders produced by the grating serve as a spatial carrier frequency. The term "spatial frequency" refers to the number of distinguishable lines per millimeter, and is characteristic of the storage capacity and resolving power of a photographic layer.

A photographic layer exposed in accordance with the invention has an image of the grating modulated in accordance with the picture, and being indistinguishable from a so-called focussed hologram as far as the function is concerned. A "focussed hologram" is a hologram in which the holographically recorded object is depicted by an objective on a photosensitive layer in such a manner that the information regarding each point of the photographed object, is also limited to a point of the photosensitive layer.

A photographic recording and reproducing method according to the invention comprises the steps of forming on a photosensitive layer the picture of an object and a grating, developing the layer, and illuminating and projecting the picture and the grating through openings while at least partly blocking a direct image corresponding to the zero order of diffraction. Due to the grating, diffraction orders for imaging the picture are produced so that the grating has the effect of a local carrier frequency.

The layer may have areas of different photosensitivity forming the grating on the exposed picture of the layer, or a foil grating is attached to the photosensitive layer before exposure. It is also possible to form the photographic image of a grating means on a photosensitive layer so that the grating is exposed on the layer. If the method of the invention is applied to color photography, in accordance with one embodiment, the layer has three layer strata respectively sensitive to different additive color components, and has gratings of different light sensitivity. In another method of the invention used for color photography, the layer is sensitive to white light, and three different gratings respectively absorbing different additive color components are projected onto the photosensitive layer. The different gratings have different grating constants and the same azimuthal angular position selected so that the power of diffraction of the wave length range of each color component projects the light in the same direction for all color component images. It is also possible to provide gratings having the same constant and different azimuth angles, requiring the filtering out of diffraction orders of the color components for eliminating undesired color component parts.

One apparatus according to the invention comprises photographic apparatus for forming on a photosensitive record carrier the picture of an object and a grating, means for developing the picture, and reproducing apparatus. The reproducing apparatus according to the invention comprises a source of light, a diaphragm having a center portion and an outer portion having openings, a condenser receiving light from the source and projecting the light onto the diaphragm, means for positioning the record carrier with the developed picture between the diaphragm and the condenser adjacent to the latter, an objective adjacent the diaphragm for imaging the picture in a focal plane, and means in the focal plane for rendering the imaged picture visible. A direct image is blocked by the center portion of the diaphragm, and the openings in the outer portion of the diaphragm produce higher diffraction orders of the light passing through the grating on the record carrier so that an image is formed in the focal plane only of diffracted rays.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
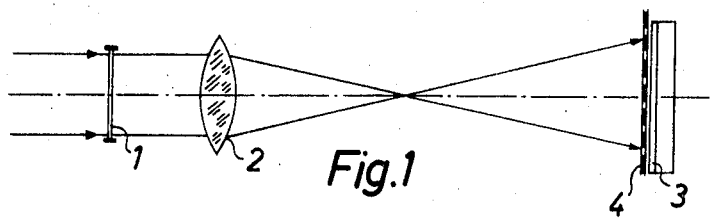
FIG. 1 is a fragmentary schematic view illustating one method of exposing a photographic layer through a grating.

As shown in FIG. 1, a grating 4 is brought into direct contact with a surface of a photosensitive layer 3. A transparent object 1 is illuminated, and the picture is imaged by lens 2 through grating 4 on the photosensitive layer 3. The grating 4 may be part of the camera, and used for several exposures in which event suitable means are provided for holding the grating in direct contact with the surface of the photosensitive layer 3. However, it is also possible to use a foil as grating, which is adhesively attached to the surface of layer 3 in the manner of a decal, and which is removed from layer 3 before the same is developed so that the grating has no influence on the chemical reactions.

In view of the object of the grating, to produce highly intensive diffraction phenomena, the grating should be as fine as possible at least 60 lines/mm, at best about 300 lines/mm. A grating can be produced photographically by superimposing two coherent rays. The density variation or the variation of the optical paths, that is the thickness of the grating and its index of refraction should be harmonic, and preferably sinusoidal. Due to the non-linearity of photographic layers, frequently a distortion of the sinusoidal variation takes place so that also higher orders of harmonic functions occur.

Figure 2:
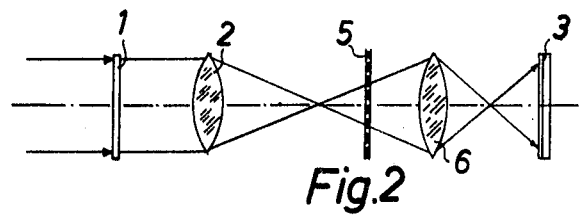
FIG. 2 is a fragmentary schematic view illustrating another method of imaging a grating on a photosensitive layer.

Another method of the invention is shown in FIG. 2 in which the objective lens 2 images the object 1 on a grating 5, which is imaged by an objective 6 on the photosensitive layer 3. In this manner, light-sensitive layer 3 receives the image of a sharply defined grating, superimposed by the image of the object 1.

Since gratings of the required fineness are not always available, impulse gratings having very steep flank variations, and having between the maximal density regions, comparatively wide transparent areas, can be exposed several times to obtain a finer grating of the several images. Between the several exposures, the grating is always shifted half its pitch, or an even smaller fraction.

Figure 3:
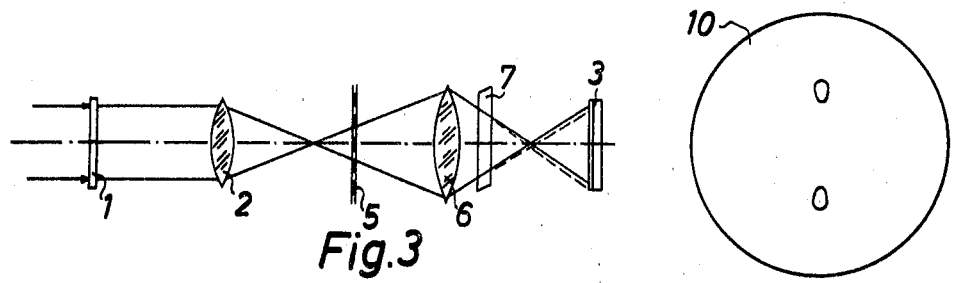
FIG. 3 is a fragmentary schematic view illustrating the exposing of a multiple grating by means producing multiple refraction.

In the method of FIG. 3, an arrangement corresponding to FIG. 2 is provided behind the objective 6 with multi-refractory means, such as a doubly refracting crystal 7 or biprism of such refractive power that the several images of grating 5 are properly staggered. Another possibility for superimposing a grating and an imaged picture is to influence the sensitivity of the photographic layer before its exposure by a picture, so that the photographic layer has a sensitivity which varies corresponding to the pattern of a grating. That may be obtained, for example, by exposing on the photosensitive layer, a grating with an intensity substantially corresponding to maximal density, developing and washing the layer, and then dissolving and eliminating the produced silver in the usual manner. During the following picture exposure, at places where the silver has been dissolved, no blackening or increase of density can take place so that a transparent grating structure remains in the layer.

Another possibility of varying the sensitivity of the photosensitive layer in accordance with the grating pattern, is to expose a grating on the layer before the exposure of the picture, but below the threshold of sensitivity.

Another way of superposing a grating on an existent silver containing image, is to transfer the silver image by diffusion through a sheet which has a different resistance pattern against diffusion in accordance with a grating. The different diffusion affinity of the layer can be obtained by a partial refining process concentrated through a grating.

Another possibility is to detachably attach one or several superimposed gratings to the surface of the layer, and remove the respective foils after exposure, and before the development.

Figure 4A:
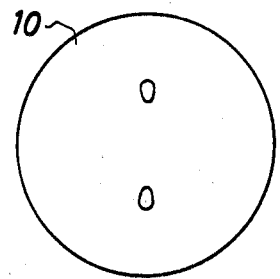
FIG. 4a is a front view of the diaphragm 10 showing the apertures in the same.
Figure 4:
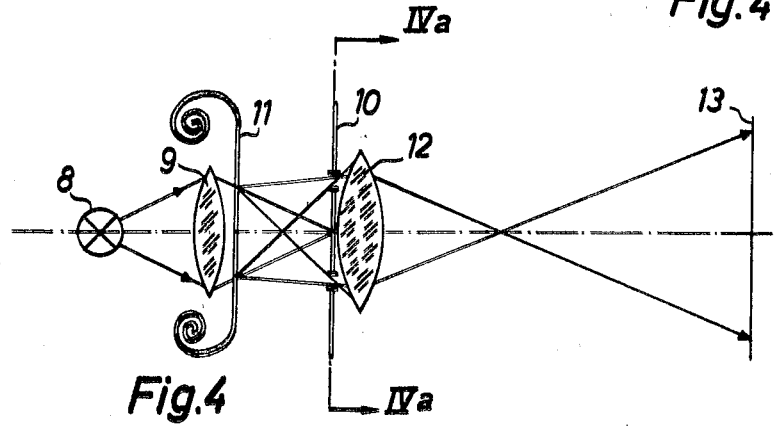
FIG. 4 is a fragmentary schematic view illustrating an apparatus for reproducing pictures made in accordance with FIGS. 1 to 3.

Apparatus for reproducing a developed image picture superimposed with a grating, is schematically illustrated in FIG. 4. A source of light 8, which should be as small as possible, is imaged by a condenser 9 on an intermediate diaphragm 10. The developed record carrier 11 is placed directly behind condenser 9, and is imaged on a screen 13, placed as closely as possible to the plane of the diaphragm 10, by an objective 12. The image of the lamp 8 is projected through condenser 9 in the respective position in the plane of diaphragm 10. Outside of the place of a direct image, which may be described as the zero diffraction order, concentrations of light, the so-called higher diffraction orders, are formed at different points of the plane of diaphragm 10, depending on the fineness and direction of the grating. If the grating is strictly sinusoidal, only the first diffraction order occurs, while gratings having harmonic characteristics of the higher order, cause the occurrence of diffraction of the higher orders.

The radial deviation of the diffraction from the optical axis is determined by the fineness of the grating, and by the angular position of the diffraction brightness in relation to the azimuthal position of the grating. By selecting the grating constant and angle, it can be determined where in the plane of the diaphragm occurs the respective order. Therefore, it is convenient to refer to a spatial carrier frequency spectrum, the grating effecting the transfer of the information representing picture in the manner of a carrier frequency.

Since the diaphragm 10 is provided with a central portion, the direct image of the source of light 8 in the plane of the diaphragm is blocked, while the rays of the higher diffraction orders are projected through corresponding openings in the outer portions of diaphgram 10 through objective 12 onto the screen 13. In this manner, a picture of the object imaged on record carrier 11 is formed on screen 13 only by rays produced by diffraction phenomena.

Figure 5A:
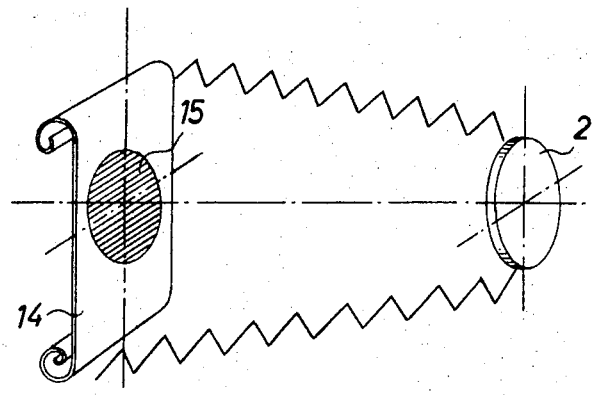
FIGS. 5a and 5b are schematic perspective views illustrating apparatus for superimposing pictures through differently positioned gratings.
Figure 5B:
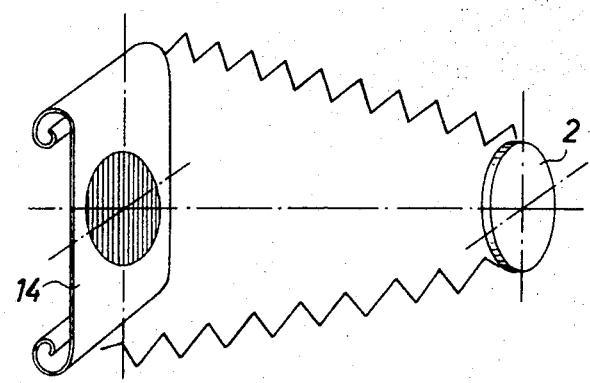

The picture on an object on a photosensitive layer can be formed by a camera in the manner schematically illustrated in FIGS. 5a and 5b. Several superimposed pictures are formed on the photosensitive layer of a film 14 by means of an objective 2. A grating 15 which is positioned directly adjacent the photosensitive layer, is also exposed with the picture of the object. Before each exposure, grating 15 is placed in a different position. The grating 15 is turned an angle of 90° in the position of FIG. 5b as compared with the position of FIG. 5a so that images of the gratings in different angular positions are formed on the photosensitive layer during successive exposures. The film 14 is developed, and is then exposed on a screen 13 by the apparatus described with reference to FIG. 4 and which the developed film is designated by reference numeral 11. Dependent on the selection of the position of the openings in the diaphragm 10, the first or the second picture can be visibly projected on screen 13, and if additional pictures were made in other positions of the grating, they can be reproduced by accordingly positioned openings in diaphragm 10.

This type of superimposing several pictures or recordings is of particular advantage for the storage of data. The gratings which provide the effect of a carrier frequency, can be utilized for coding stored information.

Figure 6:
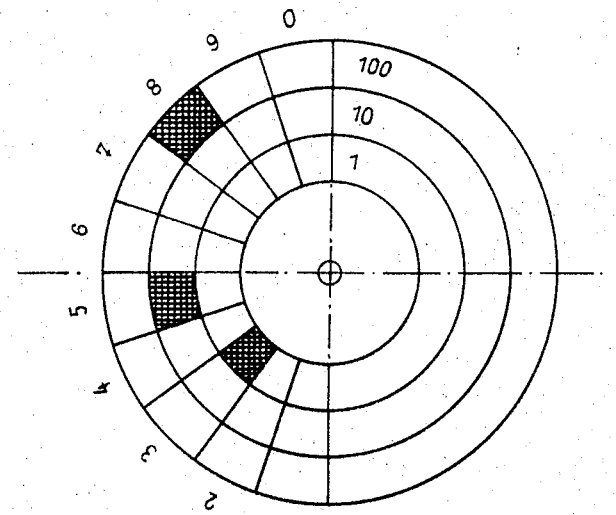
FIG. 6 is a diagrammatic view illustrating the forming of a code in the plane of the diaphragm.

FIG. 6 shows the distribution of code areas in the plane of the diaphragm 10. By means of the grating constants which determine the deviation of the bright areas from the center of the code field, and by means of the azimuthal angle of the gratings, it is, for example, possible to determine three times ten areas in which a first diffraction order occurs in the plane of the diaphragm due to the selection of agrating. Since it is possible to arrange the gratings side-by-side or in superimposed positions, a photoelectrically sensible code having a great number of orders is obtained.

In the example of FIG. 5, the grating with the coarsest grating constant is correlated with the unit order of a multiple order number, the grating with the intermediate grating constant is correlated with a second decimal order, and the grating with the finest pitch is correlated with the third decimal order of the number. By placing the three gratings in different angular positions, one thousand bits of information can be coded. The hatched areas shown in FIG. 6 represent the code number 853.

In a modified arrangement, the information representing picture which is superimposed on the grating, is used as a code. In such an arrangement, it is determined also only from the position of the diffraction orders in the spatial carrier frequency plane, which type of information is concerned.

It is of particular importance for the coding method of the invention that the positioning of the record carrier in relation to the read-out device is not critical in any manner. The position of the diffraction orders in the local frequency plane is only determined by the position of the source of light, the grating constant, and the aximuth angle of the carrier frequency grating, but not by the position of the grating in the direction of its plane. Therefore, the coded information can be practically read out during movement of the record carrier. The code signal produced by the read-out device, is then always present during the passage of an information unit through the read-out means.

The superimposing of information in the form of a picture by a grating in accordance with the invention, permits also the recording of color.

A first possibility is to use for color recording, a record carrier having three photosensitive layers or strata of the photosensitive layer, which are sensible in one of three additive basic color components, respectively, and have a sensitivity pattern distributed in accordance with a grating.

If, onto such a photosensitive layer, a three-color picture is exposed, the recording in each of the three color component layers has a grating pattern.

After development of the exposed black and white photosensitive layer, the record carrier is placed in an apparatus as described with reference to FIG. 4, and in accordance with the grating constant and the direction and angular position of the grating, different orders of diffraction are formed at different points of the plane of diaphragm 10. If the respective uncolored concentration of brightness is limited to the respective basic additive color component by a suitable color filter, a three-colored picture is projected by objective 12 onto screen 13.

Figure 7:
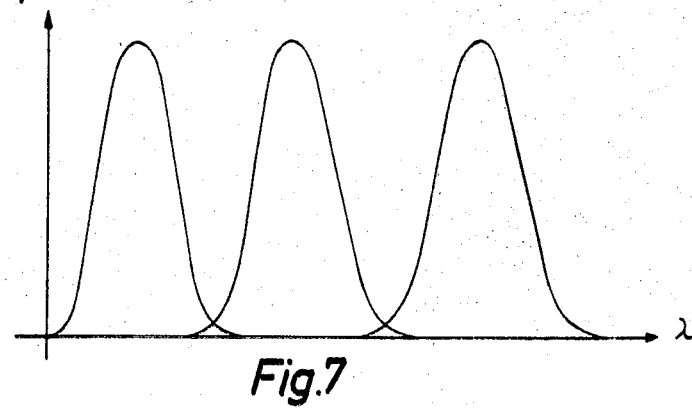
FIG. 7 is a diagram illustrating the absorption ranges of gratings used for color photography in accordance with the invention.

The recording of color pictures on a black and white film having a single photosensitive layer can be effected by the use of three superimposed gratings which, respectively, absorb one of the three basic additive color components. The absorption variation of three gratings associated with different color components, is graphically illustrated in FIG. 7. In the direction of increasing wave length λ, maxima for the color components blue, green and red are shown.

If a multi-colored picture is exposed on the black and white sensitive layer through a triple grating of this type, three color component images are formed in the photosensitive layer which are respectively modulated by the correlated absorbent grating. For example, upon exposure with white light, only the red picture details will expose the red absorbent grating on the photosensitive layer which has substantially the same sensitivity for all three color components.

In order to reproduce a black and white picture produced in this manner and containing color information, different reproduction methods are available.

In accordance with one method, the color selective gratings are designed with different grating constants, but with the same azimuthal angular direction so that the power of diffraction correlated with each color component directs the light of the wave length range associated with the respective color component, in the same direction for all three color component images. This has the effect that the differently colored rays respectively producing the different color component images, are all joined at the same point of the plane of the diaphragm, or in a point positioned mirror symmetrically to this point in relation to the optical axis, which is due to the symmetry of diffraction phenomena in relation to the optical axis. The joined color components can enter through corresponding openings in the diaphragm 10 into the objective, and together form a color picture on the screen.

A particular advantage is that due to the reproduction of the diffraction orders, a reversal of the picture is obtained, and a negative is reproduced as a positive picture. Therefore, a color negative can be observed on the screen as a positive color picture. However, if a color print is to be made, a reversal layer sensitive to the three color components must be used.

A color picture of the type exposed through three color component grids on a black and white photosensitive layer can also be reproduced by using gratings which are respectively absorbent in the three additive color components, and which have the same grating constant, but different azimuthal angles.

Figure 8:
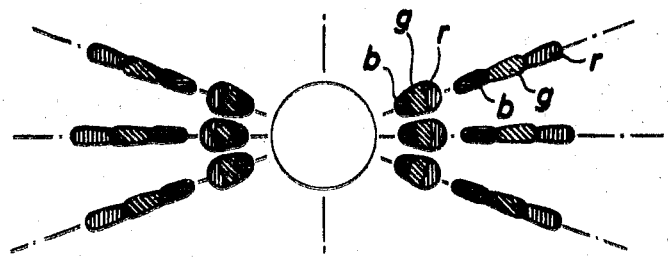
FIG. 8 is a schematic view illustrating the distribution of brightness and color components in the diaphragm plane of FIG. 4.

If the apparatus of FIG. 4 is used for reproducing the developed picture, the respective diffraction orders of the three color components are created at different points of the plane of the diaphragm 10 which are spaced the same radius from the optical axis, but are in different and staggered angular positions. During the illumination with white light, dispersion occurs so that the colors of the spectrum appear successively in outer direction. This distribution of light is schematically shown in FIG. 8. The circle at the center indicates the image of the source of light, which is shielded by the central portion of the diaphragm 10 so that no direct image can be formed by the objective 12. The directions at which the three different diffraction orders of the three-color components appear, are shown to be angularly displaced 15° corresponding to the directions of the gratings. In each of the two orders, the color components blue, green and red, with the intermediate tones, follow each other, and between the two orders there is a more or less wide interval, depending on the quality of the gratings.

If at the point of the red color component the local frequency spectrum, an additive red filter, is arranged, a corresponding red image is formed on screen 13. When suitable color component filters are used at the other points or regions of the local frequency spectrum, a color picture appears on the screen.

In accordance with another method of the invention, the color required for forming the color component image, is selected by corresponding diaphragms from the dispersion spectrum of each diffraction order. An advantage of this method is that the intensity of the respective color component images can be balanced by adjustable diaphragm apertures or the like.

It is apparent from FIG. 8 that only a comparatively small part of the spatial frequency spectrum is used in the diaphragm plane. In order to obtain an increase of the yield of the available light, a color component image is not only modulated on a carrier frequency, but on several carrier frequencies, on a carrier frequency band, or on a vector band, since intensity and direction can be varied. Although the superposition of several gratings causes a reduction of the amplitude for each grating, and a consequent reduction of the amount of diffraction light available for each carrier frequency so that in the final analysis the total of all parts of the diffracted light must be the same, as in the case when only one carrier frequency is used, nevertheless the elimination of effects of the higher orders can be achieved.

For example, for a characteristic sensitivity variation of the film layer, whose gamma function substantially deviates from a straight line, the modulation with a single frequency of correspondingly large amplitude may cause a non-linear copy of the sinusoidal grating which during the reproduction will cause the occurrence of higher diffraction orders and thereby a loss of light.

However, if the density variation is divided into several permissible modulation ranges, each of which may be considered as a linear function, and if the entire available diffraction light intensity is divided to different carrier frequencies of smaller and therefore more linear moduation, a gain of brightness of the picture may be obtained.

Due to the picture reversal, further advantages can be obtained. If on a black and white sensitive film, a carrier frequency grating foil is detachably attached, and pulled off before development, the apparatus shown in FIG. 4 can render a positive picture immediately visible. When black and white prints are made in the usual manner, the grating does not disturb the printed picture even after substantial magnification, since the used gratings are in the magnitude of several hundred lines per millimeter, and are not visible.

Another method of the invention, permits in a simple manner, contrast control of a black and white negative with a superimposed grating according to the invention. During printing, suitable diaphragm can be placed in the plane of diaphragm 10 so that light rays of the zero diffraction order, which form a direct negative image, are mixed with light of the higher diffraction orders which form a positive image at a ratio which is adjustable by the suitable selection of the apertures of the diaphragm.

It is also possible to superimpose stereo picture pairs. Upon direct penetrating illumination with a divergent bundle of rays, the directions of the rays for the two stereo pictures can be differently arranged so that each eye of an observer receives only the stereo picture suitable for the respective eye. By the use of the method employing a vector band, it is also possible to obtain observation within a very wide field angle.

The above explained methods are of course not limited to silver salt photography, but other recording and reproduction methods may be used, such as electrophotography, thermal copying, or polymerization methods. The term "photographic" is used in the present application to refer to any radiation, and not only to the visible rays of light.

The recorded picture need not be an absorption picture. The recording can be made as a phase image, for example by bleaching or refining a silver image. It is known that in this manner, a fine relief, corresponding to the original densities is formed.

It will be understood that each of the elements described above, or two or more together, may also find a useful application in other types of recording and reproducing methods and apparatus differing from the types described above.

While the invention has been illustrated and described as embodied in a photographic method employing gratings for the recordings, and a diaphragm producing diffraction orders for reproduction, it is not intended to be limited to the details shown, since various modifications and structural changes may be made without departing in any way from the spirit of the present invention.

What is claimed as new and desired to be protected by Letters Patent is set forth in the appended claims.

1. Photographic recording and reproducing method for color photography, comprising forming on a layer which is photosensitive to white light the picture of an object and three different gratings respectively absorbing three different additive color components, each of said gratings having a sinusoidal variation; and illuminating and projecting said picture and said three different gratings through an opening while at least partly blocking a direct image, said opening being positioned in such a way that, due to the sinusoidal variation of said gratings, mainly the first diffraction order is produced for imaging said picture so that said gratings have the effect of a low spatial carrier frequency, said three different gratings having different grating constants and the same azimuthal angular position selected in such a way that the power of diffraction of the wave-length range of each color component projects the light in the same direction for all color images; and removing said gratings.

2. The method of claim 1, wherein each of said gratings in an absorption grating and has a sinusoidal variation of density.

3. The method of claim 1, wherein each of said gratings is a phase grating having a sinusoidal variation of the optical distances.

4. Photographic recording and reproducing method, comprising the steps of forming the picture of an object on a photosensitive layer having areas of different photosensitivity arranged in the pattern of a grating; developing said layer so as to form on said layer a photographic reproduction of said picture combined with said grating; and illuminating and projecting said photographic reproduction of said picture combined with said grating through an opening while at least partly blocking a direct image, said opening being positioned in such a way that, due to said grating, diffraction orders for imaging said picture are produced so that said grating has the effect of a spatial carrier frequency.

5. Color photographic recording and reproducing method, comprising the steps of forming the picture of an object on a photosensitive layer having three strata which are respectively sensitive to different additive color components and having areas of different photosensitivity arranged in the pattern of a grating so as to form on each of said layers a photographic picture of said object combined with the respective grating; developing said layer; and illuminating and projecting said photographic pictures on said three strata of said photosensitive layer togehter with said gratings through an opening while at least partly blocking a direct image, said opening being positioned in such a way that, due to said gratings, diffraction orders for imaging said picture are produced so that said gratings have the effect of a spatial carrier frequency.

* * * * *